United States Patent
Cheng et al.

(10) Patent No.: US 12,026,448 B2
(45) Date of Patent: Jul. 2, 2024

(54) FONT FILE PROCESSING METHOD, ELECTRONIC DEVICE, AND READABLE STORAGE MEDIUM

(71) Applicant: VIVO MOBILE COMMUNICATION CO., LTD., Guangdong (CN)

(72) Inventors: Lin Cheng, Chang'an Dongguan (CN); Qiao Li, Chang'an Dongguan (CN); Donghui Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/971,046

(22) Filed: Oct. 21, 2022

(65) Prior Publication Data
US 2023/0059536 A1  Feb. 23, 2023

Related U.S. Application Data

(63) Continuation of application No. PCT/CN2021/089468, filed on Apr. 24, 2021.

(30) Foreign Application Priority Data

Apr. 28, 2020 (CN) .......................... 202010359534.9

(51) Int. Cl.
*G06F 40/109* (2020.01)
*G06T 11/40* (2006.01)
(52) U.S. Cl.
CPC ............ *G06F 40/109* (2020.01); *G06T 11/40* (2013.01)

(58) Field of Classification Search
CPC .............................. G06F 40/109; G06T 11/40
See application file for complete search history.

(56) References Cited

U.S. PATENT DOCUMENTS

| | | | |
|---|---|---|---|
| 9,146,907 B1* | 9/2015 | Joshi | G06F 40/109 |
| 9,547,629 B2 | 1/2017 | Konnola et al. | |
| 2002/0130871 A1 | 9/2002 | Hill | |
| 2004/0140977 A1 | 7/2004 | Hakamada | |
| 2006/0017733 A1* | 1/2006 | Matskewich | G09G 5/246 |
| | | | 345/467 |
| 2006/0276234 A1* | 12/2006 | Kang | G06F 40/109 |
| | | | 455/566 |

(Continued)

FOREIGN PATENT DOCUMENTS

| | | | |
|---|---|---|---|
| CN | 1497438 A | 5/2004 | |
| CN | 101094479 A | 12/2007 | |

(Continued)

OTHER PUBLICATIONS

Anonymous, "c++—How can I find center of object?—Stack Overflow," (2012), URL:https://stackoverflow.com/questions/12394153/how-can-i-find-center-of-object.

(Continued)

*Primary Examiner* — Kyle R Stork
(74) *Attorney, Agent, or Firm* — Brooks Kushman P.C.

(57) ABSTRACT

A font file processing method, an electronic device, and a readable storage medium are provided. The method includes: obtaining an original font file, where the original font file includes an original font; and obtaining a new font file by editing the original font and/or based on the original font and a background picture.

15 Claims, 6 Drawing Sheets

(56) References Cited

U.S. PATENT DOCUMENTS

2015/0103207 A1\* 4/2015 Nakama ................ G06T 11/001
348/239

FOREIGN PATENT DOCUMENTS

| | | |
|---|---|---|
| CN | 102130842 A | 7/2011 |
| CN | 106502968 A | 3/2017 |
| CN | 106569984 A | 4/2017 |
| CN | 108021611 A | 5/2018 |
| CN | 109615671 A | 4/2019 |
| CN | 111611771 A | 9/2020 |
| JP | H11242473 A | 9/1999 |

OTHER PUBLICATIONS

Anonymous, "Edit or Create Fonts Easily with FontForge," (2017), URL:http:/web.archive.org/web/20171022104203/https://www.trishtech.com/2014/12/edit-or-create-fonts-easily-with-fontforge/.
Extended European Search Report dated Sep. 5, 2023 as received in Application No. 21796313.1.
International Search Report and Written Opinion issued in corresponding application No. PCT/CN2021/089468, dated Jul. 22, 2021.
Indian Office Action issued in corresponding application No. 202227066515, dated Feb. 8, 2023.
First Office Action for Japanese Application No. 2022-566196, dated Nov. 20, 2023, 3 Pages.

\* cited by examiner

Background picture

FONT FILE PROCESSING METHOD, ELECTRONIC DEVICE, AND READABLE STORAGE MEDIUM

CROSS-REFERENCE TO RELATED APPLICATIONS

The present application is a bypass continuation application of International Application No. PCT/CN2021/089468 filed on Apr. 24, 2021, which claims priority to Chinese Patent Application No. 202010359534.9 filed in China on Apr. 28, 2020, both of which are incorporated herein by reference in their entirety.

TECHNICAL FIELD

The present disclosure relates to the field of electronic device technologies, and specifically, to a font file processing method, an electronic device, and a readable storage medium.

BACKGROUND

Fonts are an important tool for a user to understand information by using an electronic device such as a mobile phone.

Currently, to meet a personalized requirement of the user, multiple font styles are generally provided in the electronic device such as a mobile phone. The user may select one of the font styles to display fonts of the corresponding font style on the electronic device such as a mobile phone.

However, for the user, although multiple font styles are provided in the electronic device such as a mobile phone, the user has various requirements. Therefore, the multiple font styles provided by the electronic device such as a mobile phone are difficult to meet the personalized requirement of the user.

SUMMARY

The present disclosure provides a font file processing method, an electronic device, and a readable storage medium.

According to a first aspect, a font file processing method is provided, and includes:

obtaining an original font file, where the original font file includes an original font; and obtaining a new font file by editing the original font and/or based on the original font and a background picture According to a second aspect, an electronic device is provided, and includes:

an obtaining module, configured to obtain an original font file, where the original font file includes an original font; and a processing module, configured to obtain a new font file by editing the original font and/or based on the original font and a background picture.

According to a third aspect, another electronic device is provided, including: a processor, a memory, and a program or an instruction that is stored in the memory and that can run on the processor, and when the program or the instruction is executed by the processor, steps in the font file processing method according to the first aspect are implemented.

According to a fourth aspect, a readable storage medium is provided, where the readable storage medium stores a program or an instruction, and when the program or the instruction is executed by a processor, steps in the font file processing method according to the first aspect are implemented.

BRIEF DESCRIPTION OF DRAWINGS

The accompanying drawings, which are incorporated in the specification and constitute a part of the specification, illustrate embodiments of the present disclosure and are used together with the description thereof to explain the principles of the present disclosure.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art without creative efforts fall within the protection scope of the present disclosure.

Terms "first" and "second" in the specification and claims of the present disclosure are used to distinguish between similar objects, and are not used to describe a specific order or sequence. It should be understood that terms used in this way may be interchangeable in appropriate cases, so that the embodiments of this application can be implemented in a sequence other than those shown or described herein. In addition, in the specification and the claims, "and/or" represents at least one of connected objects, and the character "/" generally represents an "or" relationship between associated objects.

With reference to the accompanying drawings, the following describes in detail the font file processing method provided in the embodiments of the present disclosure by using a specific embodiment and an application scenario thereof.

An embodiment of the present disclosure provides a font file processing method. The method is performed by an electronic device. The electronic device may be any device with a display screen, such as a mobile phone, a tablet computer, or a wearable device. This is not limited herein. The following embodiments are described by using an electronic device as an execution entity.

Figure 1:
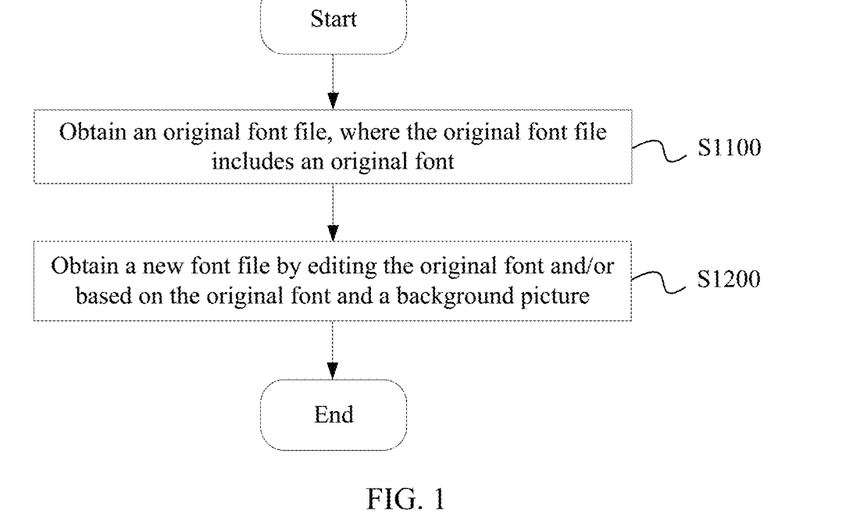
FIG. 1 is a first schematic diagram of a font file processing method according to an embodiment of the present disclosure.

As shown in FIG. 1, the method includes the following S1100 and S1200.

S1100: Obtain an original font file.

The original font file includes an original font.

In this embodiment of the present disclosure, a library file of the electronic device stores multiple types of original font files, such as an original font file in regular script, an original font file in Song typeface, and an original font file in clerical script.

In an example, one original font file includes approximately 7,000 fonts in simplified Chinese or Chinese Traditional.

In this embodiment of the present disclosure, the original font file may be any one of the multiple types of original font files stored in the foregoing library file, or may be specified by a user.

In a case that the original font file is one of the multiple original font files stored in the foregoing library file and is specified by the user, the font file processing method provided in this embodiment of the present disclosure further includes: displaying identifiers of the multiple types of original font files stored in the foregoing library file. Based on this, the user selects a type that meets a requirement of the user. In response to a selection operation of the user, the electronic device uses, as the original font file in S1100, the original font file corresponding to an identifier that is of the original font file and that is selected by the user.

S1200: Obtain a new font file by editing the original font and/or based on the original font and a background picture.

In an embodiment of the present disclosure, the new font file may be obtained by editing the original font. The original font may be edited by using the following S1210 to S1212:

S1210: Receive a first input for the original font.

S1211: Determine a first target attribute value of font attribute information in response to the first input.

The font attribute information includes at least one of a font size, a font color, or a font shape.

In this embodiment of the present disclosure, the original font file has font attribute information of the original font included in the original font file. The font attribute information may include at least one of a font size, a font color, or a font shape. Certainly, other font attribute information may also be included.

In this embodiment of the present disclosure, the electronic device may display font attribute information of the original font file and an input control used by the user to input a specific attribute value corresponding to the font attribute information. The user can input, by using the input control, a specific attribute value that meets the requirement of the user. The electronic device identifies, as the first input, an operation of inputting, by the user by using the input control, the specific attribute value that meets the requirement of the user, and uses, as the first target attribute value, the specific attribute value that meets the requirement of the user and that is input by the user by using the input control.

In an example, S1210 and S1211 are described by using an example in which the font attribute information includes a font color. The electronic device displays the font attribute information such as a font color, and further displays a color plate corresponding to the font color, where the color plate includes multiple color lumps. The user selects one of the color lumps. The electronic device identifies, as the first input, an operation of selecting a color lump by the user, and parses an RGB value corresponding to the color lump to obtain a specific attribute value of the font color, that is, the first target attribute value in this embodiment of the present disclosure. In this example, the color plate can more intuitively present a color to the user.

S1212: Adjust the font attribute information based on the first target attribute value.

In this embodiment of the present disclosure, after the electronic device adjusts the font attribute information based on the first target attribute value, the font attribute information of the original font file changes, and further, a form of the original font changes.

In this embodiment of the present disclosure, a file formed by an original font whose form changes is used as the new font file. In addition, because the first target attribute value meets the requirement of the user, the obtained new font file is a font file that meets a personalized requirement of the user.

In an embodiment of the present disclosure, the new font file may alternatively be obtained based on the original font and the background picture. The obtaining the new font file based on the original font and the background picture may be implemented by using the following S1220 to S1223:

S1220: Receive a third input.

In this embodiment of the present disclosure, in a case that the user needs to obtain the new font file, the third input is executed, to obtain the background picture. The background picture is a picture used to color the original font, and/or a picture used to add a decorative pattern to the original font. In addition, the background picture may be a picture in an RGBA format or an RGB format, or certainly, may be a picture in another color space.

Figure 2A:
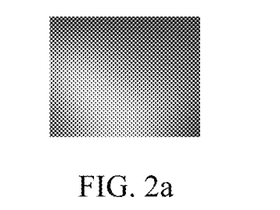
FIG. 2*a* is a schematic diagram of a background picture according to an embodiment of the present disclosure.
Figure 2B:
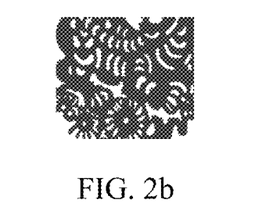
FIG. 2*b* is a schematic diagram of another background picture according to an embodiment of the present disclosure.

In an example, in a case that the background picture is a picture used to color the original font, the background picture may be a colored picture, and the colored picture may be specifically any one of a pure colored picture, a gradient colored picture, or the like. The background picture may alternatively be a colored picture with a pattern or the like. In this example, the background picture may be shown in FIG. 2a and FIG. 2b. As shown in FIG. 2a, the background picture is a gradient colored picture. As shown in FIG. 2b, the background picture is a colored picture with a red pattern of paper cutting.

In an embodiment of the present disclosure, the electronic device displays multiple to-be-selected background pictures for selection by the user. The user may select one background picture as the background picture in this embodiment of the present disclosure. In this example, the electronic device identifies a selection operation of the user as the third input.

In another embodiment of the present disclosure, the electronic device provides an interface for inputting the background picture, and the user may input the background picture through the interface. In this example, the electronic device identifies, as the third input, the user's operation of inputting the background picture through the interface.

Based on the foregoing embodiment, the font file processing method provided in this embodiment of the present disclosure may further include the step of editing the background picture. The background picture is edited, so that a background picture that meets the requirement of the user can be obtained. The step of editing the background picture may include the following steps S1220-1 and S1220-2:

S1220-1: Receive a second input for the background picture.

S1220-2: Determine a second target attribute value of picture attribute information in response to the second input.

The picture attribute information includes at least one of a picture size, picture transparency, or picture brightness.

In this embodiment of the present disclosure, the background picture has picture attribute information. The picture attribute information may include at least one of a picture size, picture transparency, or picture brightness. Certainly, other picture attribute information such as picture contrast may be included. The electronic device may display the picture attribute information of the background picture and an input control used by the user to input a specific attribute value corresponding to the picture attribute information. The user can input, by using the input control, a specific attribute value that meets the requirement of the user. The electronic device identifies, as the second input, an operation of inputting, by the user by using the input control, the specific attribute value that meets the requirement of the user, and uses, as the second target attribute value, the specific attribute value that meets the requirement of the user and that is input by the user by using the input control.

In an example, S1220-1 and S1220-2 are described by using an example in which the picture attribute information includes picture transparency. The electronic device displays the picture attribute information such as picture transparency, and further displays a slider. The user may drag the slider to input a specific attribute value that meets the requirement of the user. The electronic device identifies an operation of dragging the slider by the user as the second input, parses a location at which the slider finally keeps still, and uses a corresponding transparency value at the location as the second target attribute value.

S1220-3: Adjust the background picture based on the second target attribute value.

In this embodiment of the present disclosure, after the electronic device adjusts the background picture based on the second target attribute value, a form of the background picture changes and changes to a background picture that meets a personalized requirement of the user.

S1221: Obtain the background picture in response to the third input.

S1222: Obtain, based on the original font, a picture of preset transparency including the original font.

In this embodiment of the present disclosure, specific implementation of S1222 may be implemented by using the following S1222-1 and S1222-2:

S1222-1: Obtain, based on the original font, a picture including the original font.

In this embodiment of the present disclosure, for any original font included in the original font file, the picture including the original font is generated.

In an example, the picture including the original font may be a picture in an RGB format with black words in a white background. In this example, in the picture including the original font, an RGB value of a pixel that belongs to a font part is (0, 0, 0), and an RGB value of a pixel that does not belong to the font part is (255, 255, 255).

S1222-2: For the picture including the original font, set a transparency value of a pixel that belongs to a font part to a first transparency value, and set a transparency value of a pixel that does not belong to the font part to a second transparency value, to obtain the picture of the preset transparency including the original font.

In this embodiment of the present disclosure, the first transparency value is a value for enabling transparency of the pixel that belongs to the font part to be opaque, and the second transparency value is a value for enabling transparency of the pixel that does not belong to the font part to be transparent.

In this embodiment of the present disclosure, a transparency channel A may be added to each pixel in the picture including the original font, and a value corresponding to the transparency channel A is set to obtain the picture of the preset transparency in S1222-2. Specifically, for the picture including the original font into which the transparency channel A is added, a value of transparency A of the pixel that belongs to the font part is set to 1, and a value of transparency A of the pixel that does not belong to the font part is set to 0.

S1223: Obtain the new font file based on the background picture and the picture of the preset transparency.

In this embodiment of the present disclosure, S1223 may be implemented in any one of the following three manners:

In a first manner, S1223 may be implemented by using the following S1223-1:

S1223-1: Replace an RGB value of any pixel in the picture of the preset transparency with an RGB value of a pixel at a same location in the background picture to obtain the new font file.

In this embodiment of the present disclosure, a size of the background picture and a size of the picture of the preset transparency may be the same. Based on this, for a pixel in the picture of the preset transparency, a pixel at a same location can be found in the background picture.

In this embodiment of the present disclosure, an RGB value of any pixel in the picture of the preset transparency is replaced with an RGB value of a pixel at a same location in the background picture. In this way, in the replaced picture of the preset transparency, an RGB value of each pixel is an RGB value of a pixel at a same location in the background picture. In the picture of the preset transparency, the transparency value of the pixel that belongs to the font part is first transparency, that is, transparency of the pixel that belongs to the font part is opaque. Therefore, a color presented by a pixel that belongs to the font part and that is in the corresponding replaced picture of the preset transparency is a color presented by a pixel at a same location in the background picture.

Correspondingly, in the picture of the preset transparency, the transparency value of the pixel that does not belong to the font part is second transparency, that is, transparency of the pixel that does not belong to the font part is transparent. Therefore, regardless of an RGB value of a pixel that does not belong to the font part and that is in the replaced picture of the preset transparency, a color presented by the pixel that does not belong to the font part and that is in the replaced picture of the preset transparency remains unchanged.

It may be learned from the foregoing content that, after the electronic device performs step S1223-1, in the picture of the preset transparency, a color presented by the font part is a color presented by the background picture, and a color presented by a non-font part remains unchanged. In this way, the original font in the picture of the preset transparency may be colored by using the background picture.

Further, for each picture of the preset transparency, S1223-1 is performed, and in this way, the new font file can be obtained. It may be understood that the new font file is a font file formed after the original font is colored.

Figure 3:
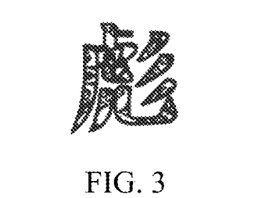
FIG. 3 is a first schematic diagram of a font picture in a new font file according to an embodiment of the present disclosure.

In an example, in a case that the background picture is shown in FIG. 2b, in a case that the original font is a font corresponding to "彪" (The English for "彪" is "a young tiger") the new font file obtained based on S1223-1, a presentation form of "彪" is shown in FIG. 3.

In the first manner, because the background picture is a background picture that meets the personalized requirement of the user, the obtained new font file is a font file that meets the personalized requirement of the user.

In a second manner, S1223 may be implemented by using the following S1223-2:

S1223-2: Replace an RGBA value of a pixel that does not belong to the font part and that is in the picture of the preset transparency with an RGBA value of a pixel at a same location in the background picture to obtain the new font file.

In this embodiment of the present disclosure, a size of the background picture and a size of the picture of the preset transparency may be the same. Based on this, for a pixel in the picture of the preset transparency, a pixel at a same location can be found in the background picture.

In this embodiment of the present disclosure, the RGBA value of the pixel that does not belong to the font part and that is in the picture of the preset transparency is replaced with the RGBA value of the pixel at the same location in the background picture. Based on this, it may be understood that, in this embodiment of the present disclosure, an RGBA value of a pixel that belongs to the font part and that is in the picture of the preset transparency remains unchanged. In this way, in the replaced picture of the preset transparency obtained by performing S1223-2, a color presented by the pixel that belongs to the font part remains unchanged, but a color presented by the pixel that does not belong to the font part is a color presented by the pixel at the same location in the background picture. In other words, in the replaced picture of the preset transparency obtained by performing S1223-2, a pattern presented by the pixel that does not belong to the font part is a pattern included in the background picture. In this way, global decoration can be added to the original font.

Further, for each picture of the preset transparency, S1223-2 is performed, and in this way, the new font file can be obtained.

Figure 4:
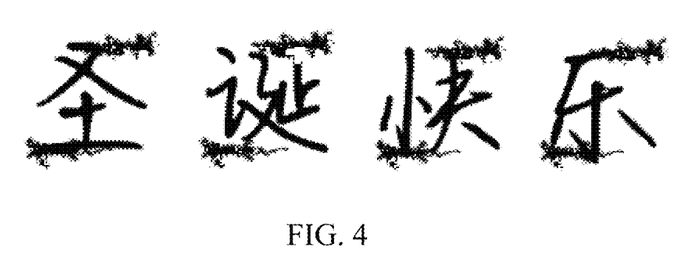
FIG. 4 is a second schematic diagram of a font picture in a new font file according to an embodiment of the present disclosure.

In an example, in a case that the background picture includes a pattern of two tree branches, for a picture of the preset transparency that includes an original font corresponding to four words "圣", "诞", "快", and "乐" (The English for "圣诞快乐" is "Merry Christmas"), a presentation form of the four words "圣", "诞", "快", and "乐" in the new font file obtained in S1223-2 is shown in FIG. 4.

It may be understood that, in a case that some pixels that belong to the font part and that are in the picture of the preset transparency are at same locations of some pixels corresponding to the pattern of two tree branches included in the background picture, after S1223-2 is performed, a beneficial effect of the picture of the preset transparency is that a part of the font in the picture of the preset transparency blocks a part of the pattern of the tree branches. Specifically, as shown in FIG. 4, a horizontal line on an uppermost part of the word "圣" and a horizontal line on a downmost part block a part of the pattern of the tree branches.

In a third manner, S1223 may be implemented by using the following S1223-3 to S1223-5:

S1223-3: Select a to-be-processed picture from the picture of the preset transparency based on a label of the background picture.

The label is used to represent a target stroke that matches the background picture, and an original font included in the to-be-processed picture includes the target stroke represented by the label.

In this embodiment of the present disclosure, the background picture is associated with a label, and the label is used to represent a target stroke that matches the background picture. The background picture is a picture that is used to add a decorative pattern to the target stroke.

In an embodiment, in a case that the background picture is provided by the electronic device, the background picture is associated with a label. For example, in a case that the background picture is a picture of a leaf, a label is associated with the background picture in advance, and a stroke represented by the label is "丿". Based on this, based on S1223-3, a picture of the preset transparency that includes an original font of the stroke "丿" in all pictures of the preset transparency is used as the to-be-processed picture.

In another embodiment, in a case that the background picture is a picture input by the user to the electronic device, when inputting the background picture, the user needs to specify the label associated with the background picture.

In this embodiment of the present disclosure, the background picture in S1223-3 is a picture that includes only a decorative pattern, that is, a picture that does not include any blank area. In a case that the background picture obtained based on S1221 includes not only a decorative pattern but also a blank area, the font file processing method provided in this embodiment may further include: clipping the background picture to a picture firmly attached to the decorative pattern, and using the clipped background picture as a new background picture.

Further, the font file processing method provided in this embodiment may further include: for the clipped background picture, setting a value of a transparency channel A of a pixel in a non-decorative pattern part to 0, to obtain a final picture.

In this embodiment of the present disclosure, for example, the input background picture is a picture including a leaf. First, the background picture is clipped, so that the clipped picture includes only a leaf but does not include another blank area. Further, to make the background picture closer to the decorative pattern in the background picture, a value of transparency A of a pixel in a non-leaf part in the clipped background picture is set to 0.

In this embodiment, because not all original fonts have a stroke that matches the background picture, not all pictures of the preset transparency can generate a new picture based on the background picture. Based on this, a picture of the preset transparency with an original font with the target stroke, that is, the to-be-processed picture, is selected from all the pictures of the preset transparency based on the label of the background picture.

S1223-4: Determine a display area of the background picture in the to-be-processed picture based on a coordinate location of a key point of the target stroke in the to-be-processed picture and a coordinate location of a key point in the background picture.

In this embodiment of the present disclosure, the background picture includes a coordinate location of a key point in the background picture. A coordinate location of a key point of the target stroke in the to-be-processed picture is obtained by the electronic device. Based on this, the font file processing method provided in this embodiment of the present disclosure further includes the step of obtaining the coordinate location of the key point of the target stroke in the to-be-processed picture. In an embodiment, this step may be implemented by using the following steps:

Step 1: Extract font skeleton information from any to-be-processed picture.

In this embodiment of the present disclosure, the font skeleton information includes a pixel of a text part in the to-be-processed picture.

Step 2: Register the extracted font skeleton information with a standard font of a known stroke to determine the coordinate location of the target stroke in the to-be-processed picture.

In this embodiment of the present disclosure, text represented by the standard font in step 2 is the same as text represented by the extracted font skeleton information. Each stroke in the standard font is marked with a corresponding stroke identifier.

In this embodiment of the present disclosure, after registration is performed, a stroke of the original font to which a pixel in the extracted font skeleton information belongs may be determined. Based on this, a pixel that belongs to the target stroke may be extracted from the font skeleton information, that is, the coordinate location of the target stroke in the to-be-processed picture is identified.

In an embodiment, registration may be performed by using a CMM registration algorithm.

Step 3: Determine the coordinate location of the key point of the target stroke based on the coordinate location of the target stroke in the to-be-processed picture.

In an embodiment of the present disclosure, the coordinate location of the key point in the target stroke may be identified by registering the target stroke with a standard stroke. The standard stroke is a stroke that is the same as the target stroke and marked with the key point of the stroke. The key point of the target stroke and a key point of the standard stroke are pixels that can outline a direction of the target stroke.

In an embodiment, the CPD registration algorithm may be used to register the target stroke with the standard stroke.

In an embodiment of the present disclosure, S1223-4 may be implemented by using the following steps:

Step 1: Determine, as a center point of the target stroke in the to-be-processed picture, a coordinate point corresponding to a coordinate average value of horizontal coordinates of the key point of the target stroke in the to-be-processed picture and a coordinate average value of vertical coordinates.

Step 2: Determine, as a center point of the background picture, a coordinate point corresponding to a coordinate average value of horizontal coordinates of the key point of the background picture and a coordinate average value of vertical coordinates.

Step 3: In a case that the center point of the background picture is aligned with the center point of the to-be-processed picture, determine a projection area of the background picture in the to-be-processed picture as a display area.

In this embodiment, in a case that the center point of the background picture is aligned with the center point of the to-be-processed picture, a size of the display area is the same as a size of the background picture.

S1223-5: Replace an RGBA value of a pixel in the display area in the to-be-processed picture with an RGBA value of a pixel at a same location in the background picture to obtain the new font file.

In this embodiment of the present disclosure, after the foregoing replacement is performed, the display area in the to-be-processed picture displays a pixel presented by the background picture, and a pixel except the display area remains unchanged. Therefore, the target stroke in the to-be-processed picture is blocked, and a decorative pattern corresponding to the background picture is displayed in the display area. In this way, the new font file obtained based on S1223-5 is a picture into which local decoration is added to the original font.

Figure 5:
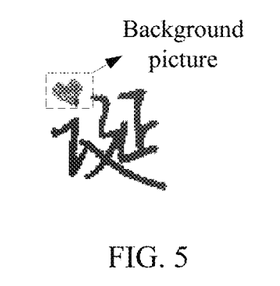
FIG. 5 is a third schematic diagram of a font picture in a new font file according to an embodiment of the present disclosure.

In an example, if the background picture is a heart pattern, and a label of the background picture is used to represent a stroke "ヽ", a presentation form of a to-be-processed picture corresponding to 诞 in the new font file is shown in FIG. 5.

In the first manner, because the background picture is a background picture that meets the personalized requirement of the user, the obtained new font file is a font file that meets the personalized requirement of the user.

In this embodiment of the present disclosure, the original font file is first obtained, and then the original font in the original font file is edited, and/or original fonts are processed in batches and in synchronization based on the original fonts and the background picture, to obtain a new font file. In this way, the new font file can be quickly generated. When the original font is processed, the original font is processed according to the requirement of the user. Therefore, the finally obtained new font file is a font file that meets the personalized requirement of the user.

In an embodiment of the present disclosure, a specific implementation of S1223 may alternatively be: replacing an RGBA value of a pixel in a specified area in the background picture with an RGBA value of the picture of the preset transparency to obtain the new font file.

In this embodiment of the present disclosure, a size of the background picture is greater than a size of the picture of the preset transparency, and a blank area, that is, the foregoing specified area, is reserved in the background picture to fill the picture of the preset transparency. In this way, a display effect of a font picture in the obtained new font file is that text is embedded in the background picture.

In an embodiment of the present disclosure, in a case that the new font file is obtained, the new font file obtained based on S1200 may be added to a font file option of the electronic device. In a case that the user needs to use the new font file, the user may select the new font file. Based on this, when displaying text, the electronic device first searches for the original font, and then searches for a corresponding font picture in the new font file based on the original font, and displays corresponding text by using the found font picture.

Based on any one of the foregoing embodiments, the font file processing method provided in this embodiment of the present disclosure further includes: updating, by using the font picture in the new font file, a picture of the preset transparency that includes an original font including same text.

In this embodiment of the present disclosure, after the picture of the preset transparency that includes the original font including the same text is updated by using the font picture in the new font file, the updated picture of the preset transparency is a font picture in the new font file obtained after the font file processing method provided in this embodiment of the present disclosure is performed. Based on this, the font picture in the new font file may be processed again based on S1200.

For example, the font picture in the new font file is a font picture in which a font is colored, and a corresponding picture of the preset transparency is updated by using the font picture in which a font is colored. When a background picture that is used to add decoration to the original font is subsequently received, a decorative pattern may be further added based on the font picture in which a font is colored.

Figure 6:
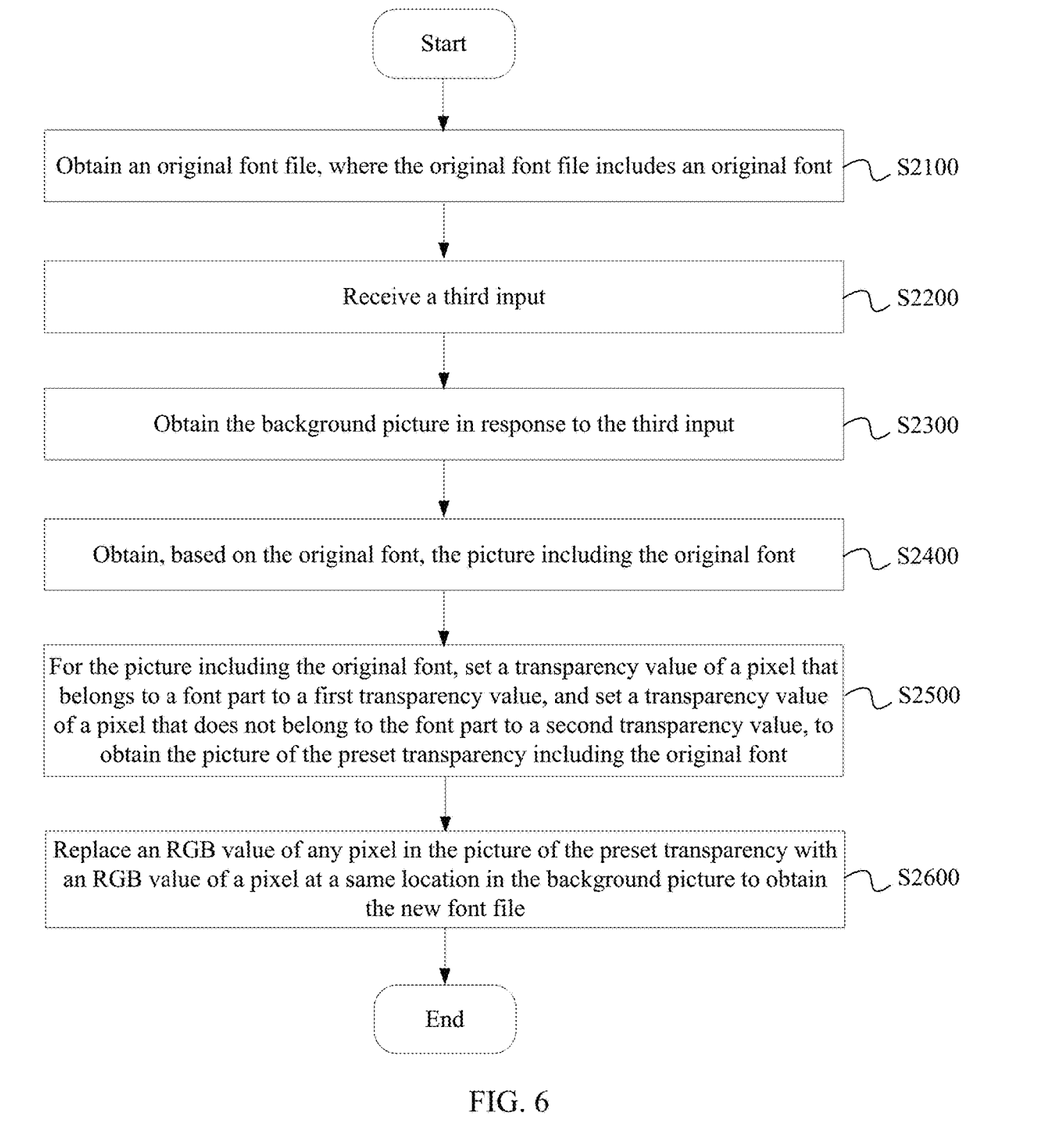
FIG. 6 is a second schematic diagram of a font file processing method according to an embodiment of the present disclosure.

Based on any one of the foregoing embodiments, as shown in FIG. 6, the font file processing method provided in this embodiment of the present disclosure may include the following S2100 to S2600:

S2100: Obtain an original font file, where the original font file includes an original font.

S2200: Receive a third input.

S2300: Obtain the background picture in response to the third input.

S2400: Obtain, based on the original font, the picture including the original font.

S2500: For the picture including the original font, set a transparency value of a pixel that belongs to a font part to a first transparency value, and set a transparency value of a pixel that does not belong to the font part to a second transparency value, to obtain the picture of the preset transparency including the original font.

S2600: Replace an RGB value of any pixel in the picture of the preset transparency with an RGB value of a pixel at a same location in the background picture to obtain the new font file.

Figure 7:
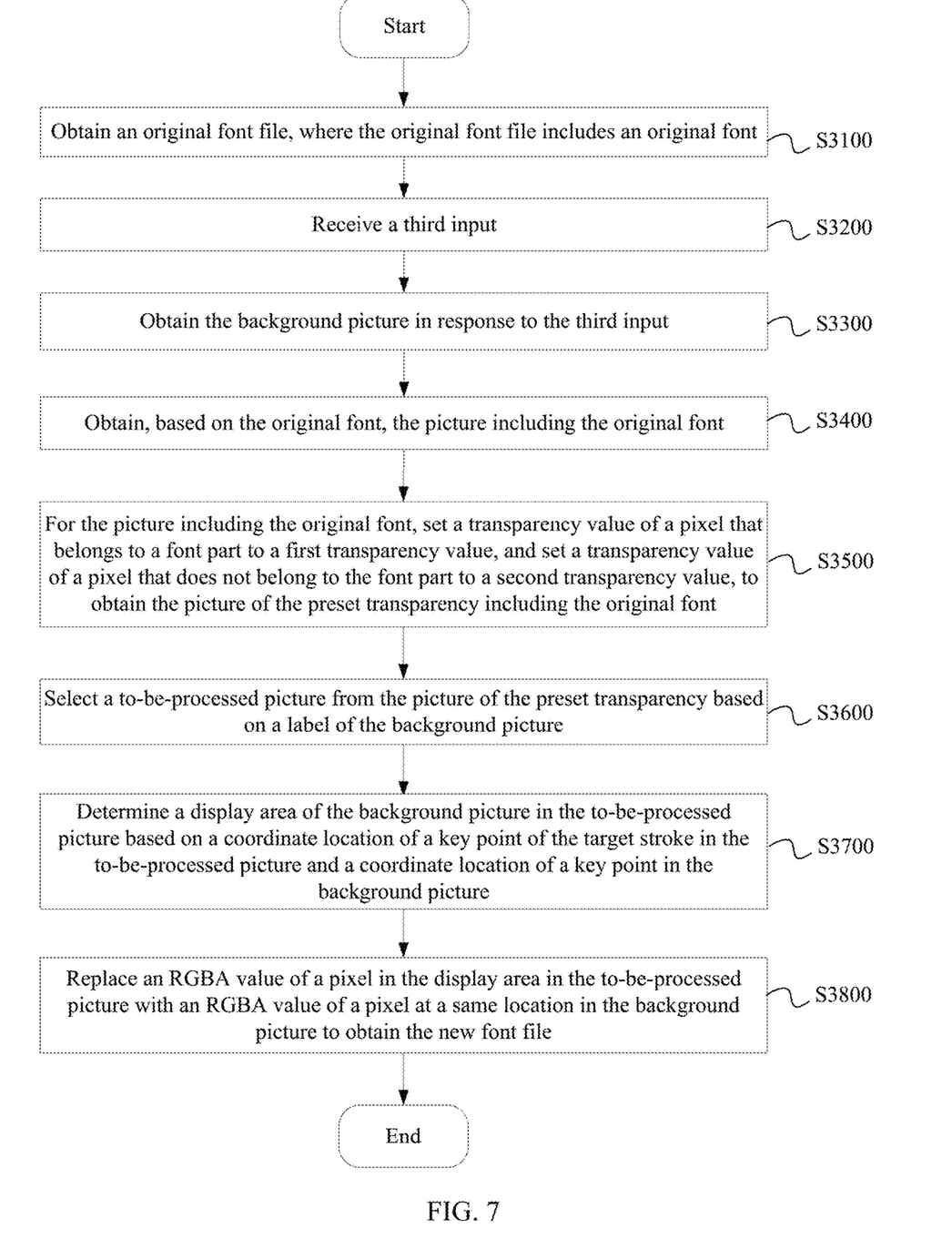
FIG. 7 is a third schematic diagram of a font file processing method according to an embodiment of the present disclosure.

Based on any one of the foregoing embodiments, as shown in FIG. 7, the font file processing method provided in this embodiment of the present disclosure further may include the following S3100 to S3800:

S3100: Obtain an original font file, where the original font file includes an original font.

S3200: Receive a third input.

S3300: Obtain the background picture in response to the third input.

S3400: Obtain, based on the original font, the picture including the original font.

S3500: For the picture including the original font, set a transparency value of a pixel that belongs to a font part to a first transparency value, and set a transparency value of a pixel that does not belong to the font part to a second transparency value, to obtain the picture of the preset transparency including the original font.

S3600: Select a to-be-processed picture from the picture of the preset transparency based on a label of the background picture.

S3700: Determine a display area of the background picture in the to-be-processed picture based on a coordinate location of a key point of the target stroke in the to-be-processed picture and a coordinate location of a key point in the background picture.

S3800: Replace an RGBA value of a pixel in the display area in the to-be-processed picture with an RGBA value of a pixel at a same location in the background picture to obtain the new font file.

Figure 8:
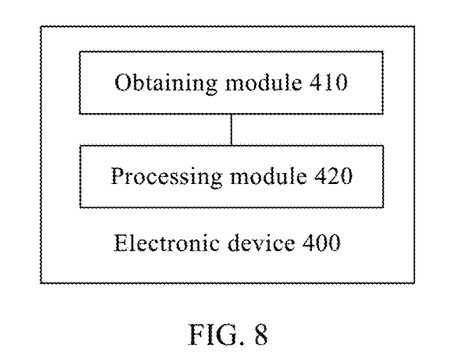
FIG. 8 is a schematic diagram of a structure of an electronic device according to an embodiment of the present disclosure.

An embodiment of the present disclosure further provides an electronic device 400, as shown in FIG. 8. The electronic device 400 may include an obtaining module 410 and a processing module 420.

The obtaining module 410 is configured to obtain an original font file, where the original font file includes an original font.

The processing module 420 is configured to obtain a new font file by editing the original font and/or based on the original font and a background picture.

In an embodiment of the present disclosure, the processing module 420 includes a first receiving unit, a first responding unit, and a first adjustment unit.

The first receiving unit is configured to receive a first input for the original font.

The first responding unit is configured to determine a first target attribute value of font attribute information in response to the first input, where the font attribute information includes at least one of a font size, a font color, or a font shape.

The first adjustment unit is configured to adjust the font attribute information based on the first target attribute value.

In an embodiment of the present disclosure, the processing module 420 includes a second receiving unit, a second responding unit, and a second adjustment unit.

The second receiving unit is configured to receive a second input for the background picture.

The second responding unit is configured to determine a second target attribute value of picture attribute information in response to the second input, where the picture attribute information includes at least one of a picture size, picture transparency, or picture brightness.

The second adjustment unit is configured to adjust the background picture based on the second target attribute value.

In an embodiment of the present disclosure, the processing module 420 includes a third receiving unit, a third responding unit, an obtaining unit, and a processing unit.

The third receiving unit is configured to receive a third input.

The third responding unit is configured to obtain the background picture in response to the third input.

The obtaining unit is configured to obtain, based on the original font, a picture of preset transparency including the original font.

The processing unit is configured to obtain the new font file based on the background picture and the picture of the preset transparency.

In an embodiment of the present disclosure, the obtaining unit is configured to:

obtain, based on the original font, the picture including the original font; and for the picture including the original font, set a transparency value of a pixel that belongs to a font part to a first transparency value, and set a transparency value of a pixel that does not belong to the font part to a second transparency value, to obtain the picture of the preset transparency including the original font.

In an embodiment of the present disclosure, the processing unit is configured to:

replace an RGB value of any pixel in the picture of the preset transparency with an RGB value of a pixel at a same location in the background picture to obtain the new font file; or replace an RGBA value of a pixel that does not belong to the font part and that is in the picture of the preset transparency with an RGBA value of a pixel at a same location in the background picture to obtain the new font file.

In an embodiment of the present disclosure, the processing unit is configured to:

select a to-be-processed picture from the picture of the preset transparency based on a label of the background picture, where the label is used to represent a target stroke matching the background picture, and an original font included in the to-be-processed picture includes the target stroke represented by the label;

determine a display area of the background picture in the to-be-processed picture based on a coordinate location of a key point of the target stroke in the to-be-processed picture and a coordinate location of a key point in the background picture; and replace an RGBA value of a pixel in the display area in the to-be-processed picture with an RGBA value of a pixel at a same location in the background picture to obtain the new font file.

In an embodiment of the present disclosure, the processing unit is configured to:

determine, as a center point of the target stroke in the to-be-processed picture, a coordinate point corresponding to a coordinate average value of horizontal coordinates of the key point of the target stroke in the to-be-processed picture and a coordinate average value of vertical coordinates;

determine, as a center point of the background picture, a coordinate point corresponding to a coordinate average value of horizontal coordinates of the key point of the background picture and a coordinate average value of vertical coordinates; and in a case that the center point of the background picture is aligned with the center point of the target stroke in the to-be-processed picture, determine a projection area of the background picture in the to-be-processed picture as the display area.

The electronic device provided in this embodiment of the present disclosure can implement processes implemented by the electronic device in embodiments of any one of the foregoing font file processing methods. To avoid repetition, details are not described herein again.

In this embodiment of the present disclosure, the obtaining module obtains the original font file, and the processing module edits the original font in the original font file, and/or processes original fonts in batches and in synchronization based on the original fonts and the background picture, to obtain a new font file. In this way, the new font file can be quickly generated. When the original font is processed, the original font is processed according to a requirement of a user. Therefore, the finally obtained new font file is a font file that meets a personalized requirement of the user.

Figure 9:
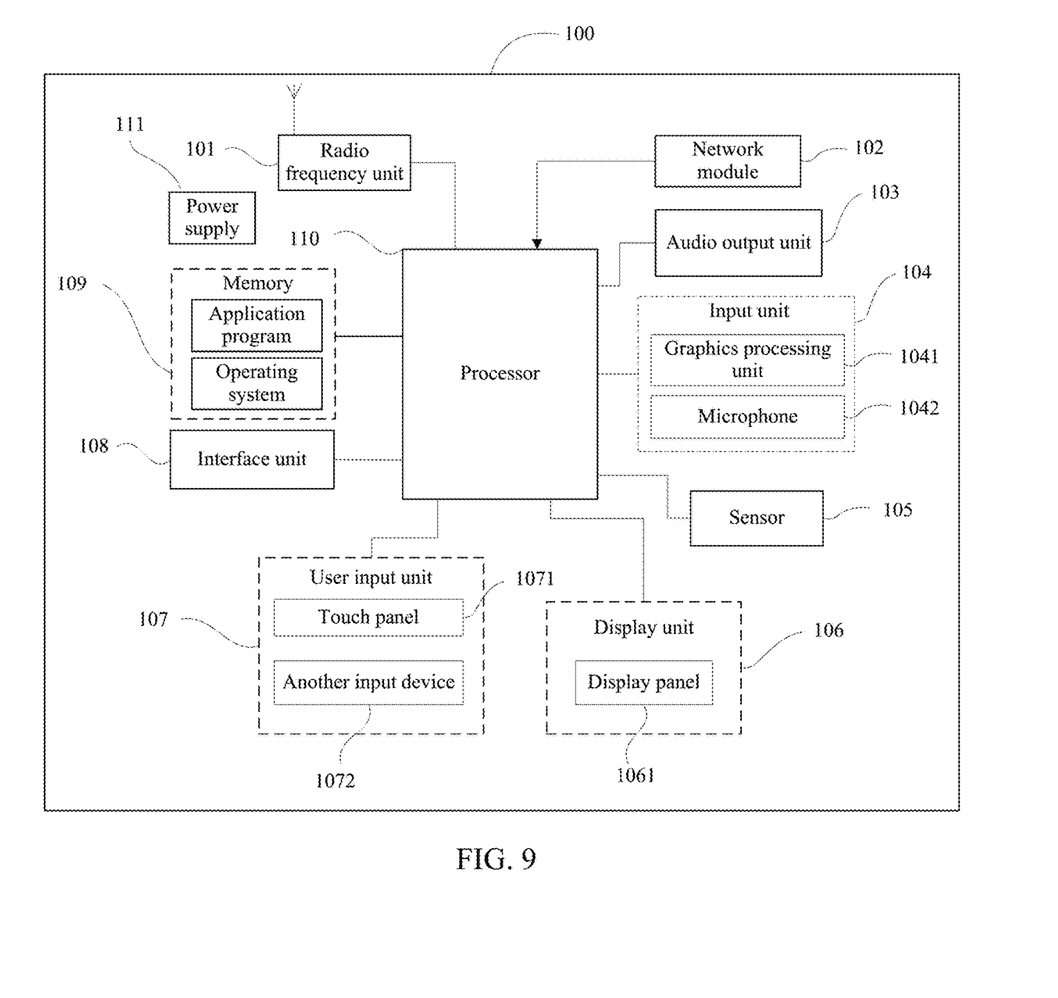
FIG. 9 is a schematic diagram of a hardware structure of an electronic device for implementing embodiments of the present disclosure.

FIG. 9 is a schematic diagram of a hardware structure of an electronic device for implementing the embodiments of the present disclosure. The electronic device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that a structure of the electronic device shown in FIG. 9 does not constitute a limitation on the electronic device, and the electronic device may include more or fewer components than those shown in the figure, or combine some components, or have different component arrangements. In this embodiment of the present disclosure, the electronic device includes but is not limited to a mobile phone, a tablet computer, a laptop computer, a palmtop computer, an in-vehicle terminal, a wearable device, and the like.

The processor 110 is configured to: obtain an original font file, where the original font file includes an original font; and obtain a new font file by editing the original font and/or based on the original font and a background picture.

In this embodiment of the present disclosure, the electronic device obtains the original font file, and edits the original font in the original font file, and/or processes original fonts in batches and in synchronization based on the original fonts and the background picture, to obtain a new font file. In this way, the new font file can be quickly generated. When the original font is processed, the original font is processed according to a requirement of a user. Therefore, the finally obtained new font file is a font file that meets a personalized requirement of the user.

It should be understood that, in this embodiment of the present disclosure, the radio frequency unit 101 may be configured to receive and send information or receive and send a signal in a call process. Specifically, after downlink data from a base station is received, the processor 110 processes the downlink data. In addition, uplink data is sent to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and another device by using a wireless communication system.

The electronic device provides wireless broadband Internet access for the user by using the network module 102, for example, helping the user send and receive an email, browse a web page, and access streaming media.

The audio output unit 103 may convert audio data received by the radio frequency unit 101 or the network module 102 or stored in the memory 109 into an audio signal and output as sound. In addition, the audio output unit 103 may further provide audio output (for example, call signal receiving sound or message receiving sound) related to a specific function performed by the electronic device 100. The audio output unit 103 includes a speaker, a buzzer, a telephone receiver, and the like.

The input unit 104 is configured to receive an audio or video signal. The input unit 104 may include a graphics processing unit (GPU) 1041 and a microphone 1042. The graphics processing unit 1041 processes picture data of a static picture or a video obtained by an image capture apparatus (such as a camera) in a video capture mode or an image capture mode. A processed picture frame may be displayed on the display unit 106. The picture frame processed by the graphics processing unit 1041 may be stored in the memory 109 (or another storage medium) or sent by using the radio frequency unit 101 or the network module 102. The microphone 1042 may receive sound and can process such sound into audio data. The processed audio data may be output by being converted into a format that may be sent to a mobile communications base station by using the radio frequency unit 101 in a telephone call mode.

The electronic device 100 further includes at least one sensor 105, such as an optical sensor, a motion sensor, and another sensor. Specifically, the optical sensor includes an ambient light sensor and a proximity sensor. The ambient light sensor may adjust brightness of a display panel 1061 based on brightness of ambient light, and the proximity sensor may disable the display panel 1061 and/or backlight when the electronic device 100 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a gesture of an electronic device (for example, horizontal and vertical screen switching, a related game, or magnetometer posture calibration), a function related to vibration recognition (for example, a pedometer or a strike), or the like. The sensor 105 may further include a fingerprint sensor, a pressure sensor, an iris sensor, a molecular sensor, a gyroscope, a barometer, a hygrometer, a thermometer, an infrared sensor, and the like. This is not described herein.

The display unit 106 is configured to display information entered by the user or information provided for the user. The display unit 106 may include a display panel 1061, and the display panel 1061 may be configured in a form of a liquid crystal display (LCD), an organic light-emitting diode (OLED), or the like.

The user input unit 107 may be configured to receive input digit or character information and generate key signal input related to user setting and function control of the electronic device. Specifically, the user input unit 107 includes a touch panel 1071 and another input device 1072. The touch panel 1071, also referred to as a touchscreen, may collect a touch operation performed by the user on or near the touch panel 1071 (for example, an operation performed by the user on or near the touch panel 1071 by using any suitable object or accessory such as a finger or a stylus). The touch panel 1071 may include two parts: a touch detection apparatus and a touch controller. The touch detection apparatus detects a touch location of the user, detects a signal brought by the touch operation, and transmits the signal to the touch controller. The touch controller receives touch information from the touch detection apparatus, converts the touch information into contact coordinates, sends the contact coordinates to the processor 110, and can receive and execute a command sent by the processor 110. In addition, the touch panel 1071 may be implemented by using multiple types such as a resistive type, a capacitive type, an infrared ray, and a surface acoustic wave. The user input unit 107 may include another input device 1072 in addition to the touch panel 1071. Specifically, the another input device 1072 may include but is not limited to one or more of a physical keyboard, a function key (such as a volume control key or an on/off key), a trackball, a mouse, a joystick, and the like. Details are not described herein.

Further, the touch panel 1071 may cover the display panel 1061. After detecting the touch operation on or near the touch panel 1071, the touch panel 1071 transmits the touch operation to the processor 110 to determine a type of a touch event, and then the processor 110 provides corresponding visual output on the display panel 1061 based on the type of the touch event. In FIG. 9, the touch panel 1071 and the display panel 1061 are used as two independent components to implement input and output functions of the electronic device. However, in some embodiments, the touch panel 1071 and the display panel 1061 may be integrated to implement the input and output functions of the electronic device. This is not specifically limited herein.

The interface unit 108 is an interface connecting an external apparatus to the electronic device 100. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 108 may be configured to receive input (for example, data information and power) from the external apparatus and transmit the received input to one or more elements in the electronic device 100, or may be configured to transmit data between the electronic device 100 and the external apparatus.

The memory 109 may be configured to store a software program and various data. The memory 109 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 109 may include a high-speed random access memory, and may further include a non-volatile memory such as at least one magnetic disk storage component, a flash memory component, or another volatile solid-state storage component.

The processor 110 is a control center of the electronic device, and is connected to all parts of the entire electronic device by using various interfaces and lines, and performs various functions of the electronic device and processes data by running or executing the software program and/or the module that are stored in the memory 109 and invoking the data stored in the memory 109, to implement overall monitoring on the electronic device. The processor 110 may include one or more processing units. Preferentially, the processor 110 may be integrated with an application processor and a modem processor. The application processor mainly processes an operating system, a user interface, an application program, and the like, and the modem processor mainly processes wireless communication. It may be understood that the modem processor may also not be integrated into the processor 110.

The electronic device 100 may further include a power supply 111 (such as a battery) that supplies power to each component. Preferably, the power supply 111 may be logically connected to the processor 110 by using a power management system, to implement functions such as charging, discharging, and power consumption management by using the power management system.

In addition, the electronic device 100 includes some function modules not shown, and details are not described herein.

Figure 10:
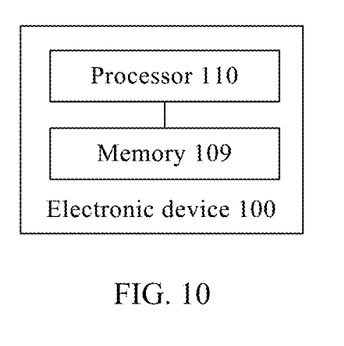
FIG. 10 is a schematic diagram of a structure of another electronic device according to an embodiment of the present disclosure.

An embodiment of the present disclosure further provides an electronic device 100, including, as shown in FIG. 10, a processor 110, a memory 109, and a program or an instruction that is stored in the memory 109 and may run on the processor 110. When the program or the instruction is executed by the processor 110, processes of the embodiments of the font file processing method can be implemented, and a same technical effect can be achieved. To avoid repetition, details are not described herein.

An embodiment of the present disclosure further provides a computer-readable storage medium. A computer program is stored in the computer-readable storage medium. When being executed by a processor, processes of the embodiments of the font file processing method are implemented, and a same technical effect can be achieved. To avoid repetition, details are not described herein. The computer-readable storage medium includes a read-only memory (ROM), a random access memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A font file processing method, performed by an electronic device, comprising:
   obtaining an original font file, wherein the original font file comprises an original font; and
   either editing the original font and obtaining a new font file based on the edited original font and a background picture or obtaining a new font file based on the original font and a background picture;
   wherein the obtaining a new font file based on the original font and a background picture comprises:
   receiving a third input;
   obtaining the background picture in response to the third input;
   obtaining, based on the original font, a picture of preset transparency comprising the original font; and
   obtaining the new font file based on the background picture and the picture of the preset transparency;
   wherein the obtaining the new font file based on the background picture and the picture of the preset transparency comprises:
   selecting a to-be-processed picture from the picture of the preset transparency based on a label of the background picture, wherein the label is used to represent a target stroke matching the background picture, and an original font comprised in the to-be-processed picture comprises the target stroke represented by the label;
   determining a display area of the background picture in the to-be-processed picture based on a coordinate location of a key point of the target stroke in the to-be-processed picture and a coordinate location of a key point in the background picture; and
   replacing an RGBA value of a pixel in the display area in the to-be-processed picture with an RGBA value of a pixel at a same location in the background picture to obtain the new font file.

2. The method according to claim 1, wherein editing the original font comprises:
   receiving a first input for the original font;
   determining a first target attribute value of font attribute information in response to the first input, wherein the font attribute information comprises at least one of a font size, a font color, or a font shape; and
   adjusting the font attribute information based on the first target attribute value.

3. The method according to claim 1, wherein the method further comprises:
   receiving a second input for the background picture;
   determining a second target attribute value of picture attribute information in response to the second input, wherein the picture attribute information comprises at least one of a picture size, picture transparency, or picture brightness; and
   adjusting the background picture based on the second target attribute value.

4. The method according to claim 1, wherein the obtaining, based on the original font, a picture of preset transparency comprising the original font comprises:
   obtaining, based on the original font, the picture comprising the original font; and
   for the picture comprising the original font, setting a transparency value of a pixel that belongs to a font part to a first transparency value, and setting a transparency value of a pixel that does not belong to the font part to a second transparency value, to obtain the picture of the preset transparency comprising the original font.

5. The method according to claim 1, wherein the obtaining the new font file based on the background picture and the picture of the preset transparency comprises:
   replacing an RGB value of any pixel in the picture of the preset transparency with an RGB value of a pixel at a same location in the background picture to obtain the new font file; or
   replacing an RGBA value of a pixel that does not belong to the font part and that is in the picture of the preset transparency with an RGBA value of a pixel at a same location in the background picture to obtain the new font file.

6. The method according to claim 1, the determining a display area of the background picture in the to-be-processed picture based on a coordinate location of a key point of the target stroke in the to-be-processed picture and a coordinate location of a key point in the background picture comprises:
   determining, as a center point of the target stroke in the to-be-processed picture, a coordinate point corresponding to a coordinate average value of horizontal coordinates of the key point of the target stroke in the to-be-processed picture and a coordinate average value of vertical coordinates;
   determining, as a center point of the background picture, a coordinate point corresponding to a coordinate average value of horizontal coordinates of the key point of the background picture and a coordinate average value of vertical coordinates; and
   in a case that the center point of the background picture is aligned with the center point of the target stroke in the to-be-processed picture, determining a projection area of the background picture in the to-be-processed picture as the display area.

7. An electronic device, comprising: a processor, a memory, and a program or an instruction that is stored in the memory and that can run on the processor, wherein when the program or the instruction is executed by the processor, the following steps are implemented:
   obtaining an original font file, wherein the original font file comprises an original font; and
   either editing the original font and obtaining a new font file based on the edited original font and a background picture or obtaining a new font file based on the original font and a background picture;

wherein when the program or the instruction is executed by the processor, the following steps are further implemented:

receiving a third input;

obtaining the background picture in response to the third input;

obtaining, based on the original font, a picture of preset transparency comprising the original font; and obtaining the new font file based on the background picture and the picture of the preset transparency;

wherein when the program or the instruction is executed by the processor, the following steps are further implemented:

selecting a to-be-processed picture from the picture of the preset transparency based on a label of the background picture, wherein the label is used to represent a target stroke matching the background picture, and an original font comprised in the to-be-processed picture comprises the target stroke represented by the label;

determining a display area of the background picture in the to-be-processed picture based on a coordinate location of a key point of the target stroke in the to-be-processed picture and a coordinate location of a key point in the background picture; and replacing an RGBA value of a pixel in the display area in the to-be-processed picture with an RGBA value of a pixel at a same location in the background picture to obtain the new font file.

8. The electronic device according to claim 7, wherein when the program or the instruction is executed by the processor, the following steps are further implemented:

receiving a first input for the original font;

determining a first target attribute value of font attribute information in response to the first input, wherein the font attribute information comprises at least one of a font size, a font color, or a font shape; and adjusting the font attribute information based on the first target attribute value.

9. The electronic device according to claim 7, wherein when the program or the instruction is executed by the processor, the following steps are further implemented:

receiving a second input for the background picture;

determining a second target attribute value of picture attribute information in response to the second input, wherein the picture attribute information comprises at least one of a picture size, picture transparency, or picture brightness; and adjusting the background picture based on the second target attribute value.

10. The electronic device according to claim 7, wherein when the program or the instruction is executed by the processor, the following steps are further implemented:

obtaining, based on the original font, the picture comprising the original font;

and for the picture comprising the original font, setting a transparency value of a pixel that belongs to a font part to a first transparency value, and setting a transparency value of a pixel that does not belong to the font part to a second transparency value, to obtain the picture of the preset transparency comprising the original font.

11. The electronic device according to claim 7, wherein when the program or the instruction is executed by the processor, the following steps are further implemented:

replacing an RGB value of any pixel in the picture of the preset transparency with an RGB value of a pixel at a same location in the background picture to obtain the new font file; or replacing an RGBA value of a pixel that does not belong to the font part and that is in the picture of the preset transparency with an RGBA value of a pixel at a same location in the background picture to obtain the new font file.

12. The electronic device according to claim 7, wherein when the program or the instruction is executed by the processor, the following steps are further implemented:

determining, as a center point of the target stroke in the to-be-processed picture, a coordinate point corresponding to a coordinate average value of horizontal coordinates of the key point of the target stroke in the to-be-processed picture and a coordinate average value of vertical coordinates;

determining, as a center point of the background picture, a coordinate point corresponding to a coordinate average value of horizontal coordinates of the key point of the background picture and a coordinate average value of vertical coordinates; and in a case that the center point of the background picture is aligned with the center point of the target stroke in the to-be-processed picture, determining a projection area of the background picture in the to-be-processed picture as the display area.

13. A non-transitory computer readable storage medium, wherein the readable storage medium stores a program or an instruction, and when the program or the instruction is executed by a processor, the following steps are implemented:

obtaining an original font file, wherein the original font file comprises an original font; and either editing the original font and obtaining a new font file based on the edited original font and a background picture or obtaining a new font file based on the original font and a background picture;

wherein when the program or the instruction is executed by the processor, the following steps are further implemented:

receiving a third input;

obtaining the background picture in response to the third input;

obtaining, based on the original font, a picture of preset transparency comprising the original font; and obtaining the new font file based on the background picture and the picture of the preset transparency;

wherein when the program or the instruction is executed by the processor, the following steps are further implemented:

selecting a to-be-processed picture from the picture of the preset transparency based on a label of the background picture, wherein the label is used to represent a target stroke matching the background picture, and an original font comprised in the to-be-processed picture comprises the target stroke represented by the label;

determining a display area of the background picture in the to-be-processed picture based on a coordinate location of a key point of the target stroke in the to-be-processed picture and a coordinate location of a key point in the background picture; and replacing an RGBA value of a pixel in the display area in the to-be-processed picture with an RGBA value of a pixel at a same location in the background picture to obtain the new font file.

14. The non-transitory computer readable storage medium according to claim 13, wherein when the program or the instruction is executed by the processor, the following steps are further implemented:
- receiving a first input for the original font;
- determining a first target attribute value of font attribute information in response to the first input, wherein the font attribute information comprises at least one of a font size, a font color, or a font shape; and
- adjusting the font attribute information based on the first target attribute value.

15. The non-transitory computer readable storage medium according to claim 13, wherein when the program or the instruction is executed by the processor, the following steps are further implemented:
- receiving a second input for the background picture;
- determining a second target attribute value of picture attribute information in response to the second input, wherein the picture attribute information comprises at least one of a picture size, picture transparency, or picture brightness; and
- adjusting the background picture based on the second target attribute value.

\* \* \* \* \*